(12) United States Patent
Murakami

(10) Patent No.: US 11,037,006 B2
(45) Date of Patent: Jun. 15, 2021

(54) OCCUPANT DETECTION DEVICE

(71) Applicant: AISIN SEIKI KABUSHIKI KAISHA, Kariya (JP)

(72) Inventor: Shinichiro Murakami, Tokyo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 88 days.

(21) Appl. No.: 16/467,543

(22) PCT Filed: Sep. 5, 2017

(86) PCT No.: PCT/JP2017/031994
§ 371 (c)(1),
(2) Date: Jun. 7, 2019

(87) PCT Pub. No.: WO2018/109997
PCT Pub. Date: Jun. 21, 2018

(65) Prior Publication Data
US 2019/0340451 A1    Nov. 7, 2019

(30) Foreign Application Priority Data
Dec. 16, 2016 (JP) .............................. JP2016-244706

(51) Int. Cl.
*G06K 9/00* (2006.01)
*G06T 7/62* (2017.01)

(52) U.S. Cl.
CPC ..... *G06K 9/00838* (2013.01); *G06K 9/00369* (2013.01); *G06T 7/62* (2017.01); *G06T 2207/30268* (2013.01)

(58) Field of Classification Search
CPC .. G06K 9/00838; G06K 9/00369; G06T 7/62; G06T 2207/30268; B60R 21/015; G01B 11/00
See application file for complete search history.

(56) References Cited

U.S. PATENT DOCUMENTS

2002/0050924 A1  5/2002  Mahbub
2004/0040772 A1* 3/2004  Ertl ................... B60R 21/01538
                                                        180/271
(Continued)

FOREIGN PATENT DOCUMENTS

| JP | 2004-503759 A | 2/2004 |
| JP | 2006-176075 A | 7/2006 |
| JP | 2012-127811 A | 7/2012 |

OTHER PUBLICATIONS

International Search Report for PCT/JP2017/031994 dated Oct. 10, 2017 (PCT/ISA/210).

*Primary Examiner* — Ping Y Hsieh
(74) *Attorney, Agent, or Firm* — Sughrue Mion, PLLC

(57) ABSTRACT

An occupant detection device of an embodiment includes, for example: an acquirer that acquires captured image data output from an image capturer capturing a seat and distance data indicating a distance to an occupant present in a direction of the seat; a seat specifier that specifies a position of a surface of the seat; a trunk surface specifier that specifies a position of a surface representing a trunk of the occupant based on the captured image data and the distance data; and a calculator that calculates a volume of the trunk of the occupant present between the seat and the image capturer based on the position of the surface representing the trunk and the position of the surface of the seat.

4 Claims, 7 Drawing Sheets

(56) References Cited

U.S. PATENT DOCUMENTS

2006/0138759 A1* 6/2006 Aoki .................. B60R 21/0152
280/735
2007/0289799 A1  12/2007 Aoki et al.
2008/0021616 A1  1/2008 Aoki et al.

* cited by examiner

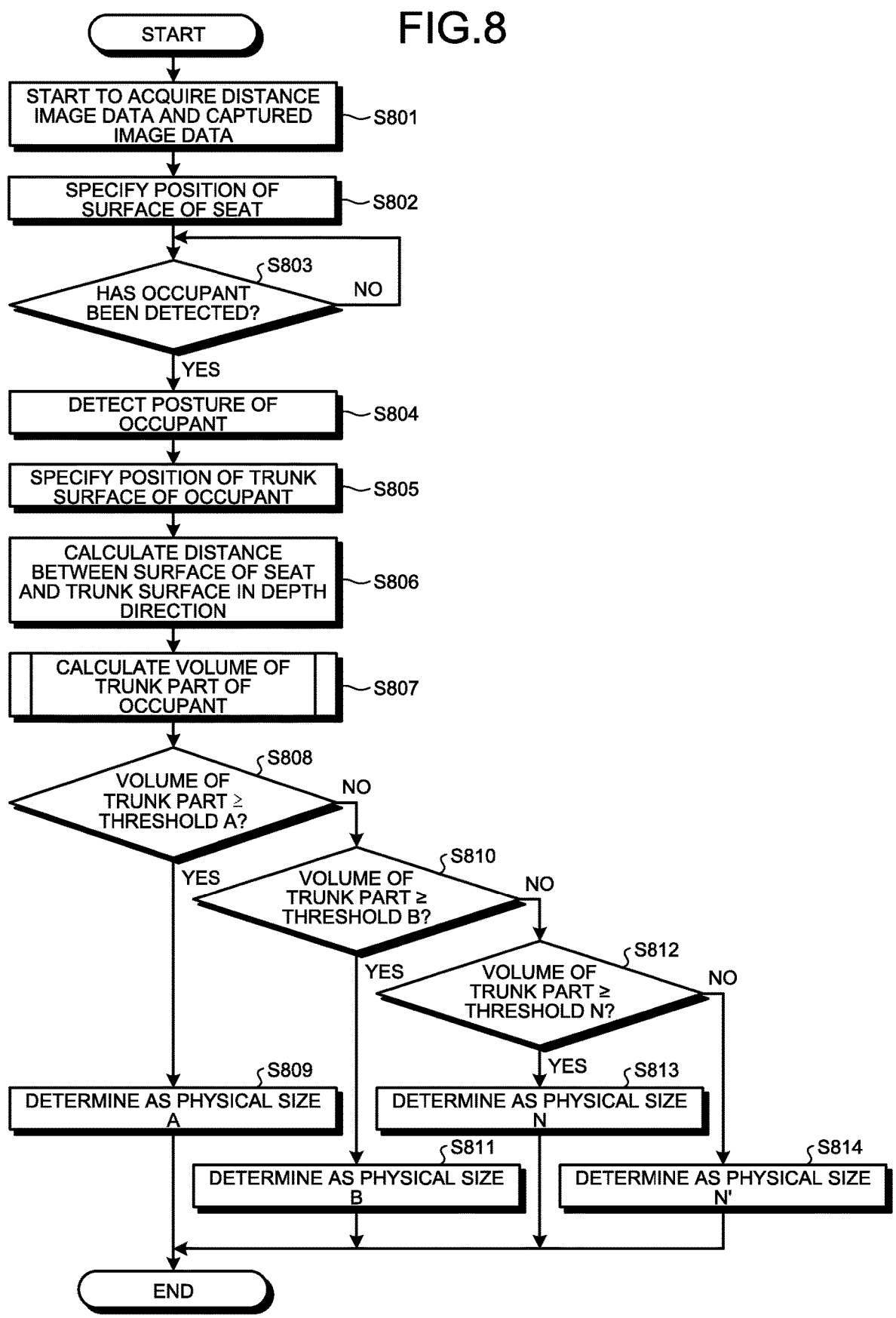

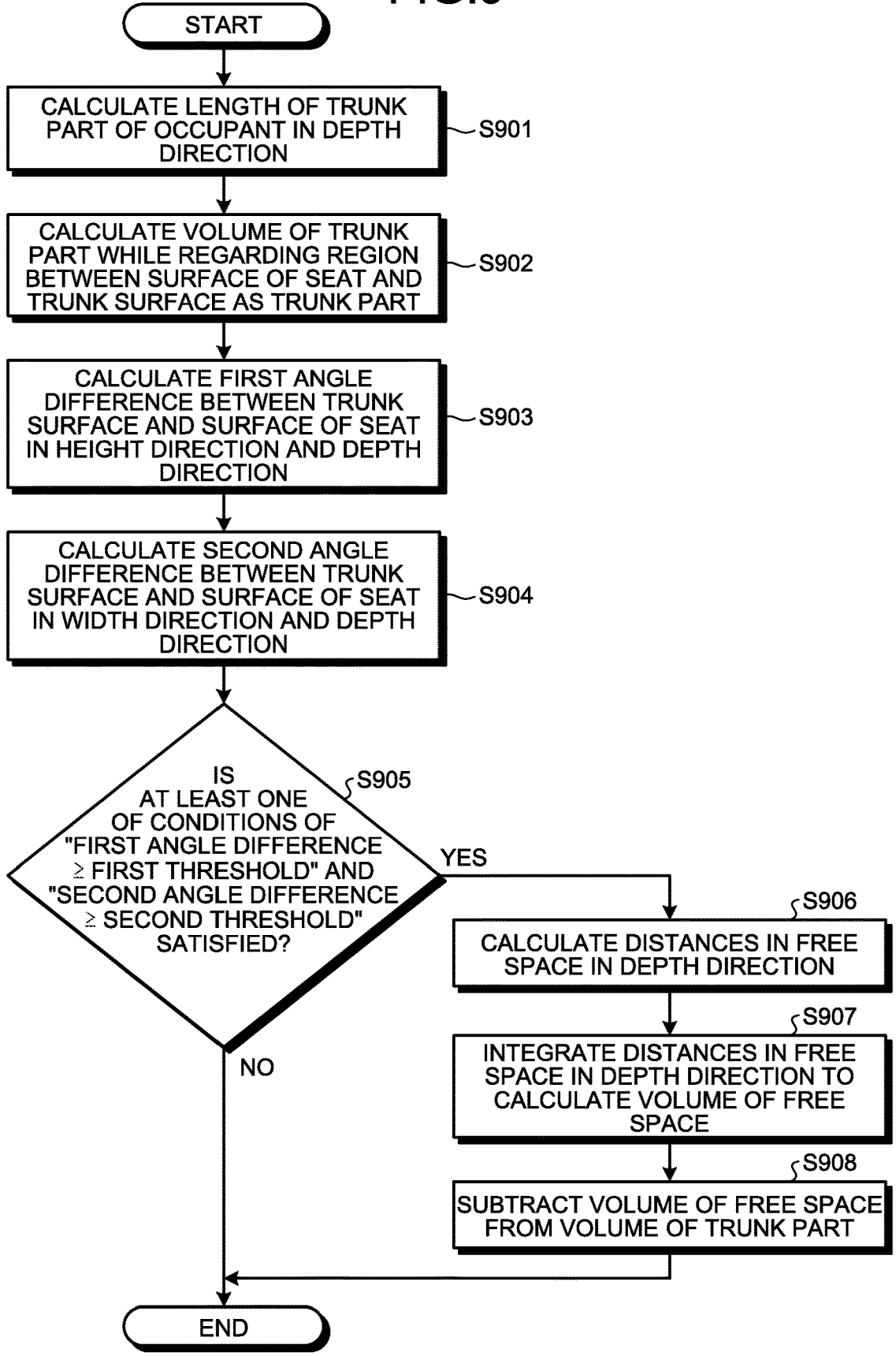

OCCUPANT DETECTION DEVICE

CROSS REFERENCE TO RELATED APPLICATIONS

This application is national stage application of International Application No. PCT/JP2017/031994, filed Sep. 5, 2017, which designates the United States, incorporated herein by reference, and which is based upon and claims the benefit of priority from Japanese Patent Application No. 2016-244706, filed Dec. 16, 2016, the entire contents of which are incorporated herein by reference.

TECHNICAL FIELD

Embodiments of the present invention relate to an occupant detection device.

BACKGROUND ART

Conventionally, there have been known various technologies for detecting information on objects seated on a seat in a vehicle by using photographing means such as a camera.

Furthermore, it is demanded to easily and accurately detect information on an occupant of a vehicle for using the information on the occupant of the vehicle in control of an activation device for an airbag device and the like.

For example, it is demanded to control an airbag device in accordance with a physical size of the occupant by detecting an occupant present on a seat and the physical size of the occupant using by photographing means such as a camera.

CITATION LIST

Patent Literature

Patent Literature 1: Japanese Translation of PCT International Application Publication No. JP-T-2004-503759

SUMMARY OF INVENTION

Problem to be Solved by the Invention

In the conventional technology, however, the volume of an object on a seat is estimated based on an occupant imaged in image data, and the physical size is determined based on the volume of the object, but no consideration is taken in a positional relation between the seat and the occupant. For example, when an air gap is present between the seat and the occupant, the total volume of the occupant and the air gap is estimated, and hence a deviation from the actual volume of the occupant occurs.

Means for Solving Problem

An occupant detection device of an embodiment includes, for example: an acquirer that acquires captured image data output from an image capturer capturing a seat and distance data indicating a distance to an occupant present in a direction of the seat; a seat specifier that specifies a position of a surface of the seat; a trunk surface specifier that specifies a position of a surface representing a trunk of the occupant based on the captured image data and the distance data; and a calculator that calculates a volume of the trunk of the occupant present between the seat and the image capturer based on the position of the surface representing the trunk and the position of the surface of the seat. With this configuration, for example, the volume of the occupant is calculated in consideration of the surface of the seat. Consequently, the calculation accuracy of the volume of the occupant can be improved.

In the occupant detection device of the embodiment, for example, the calculator further calculates a volume of a free space between the occupant and the seat based on a difference in distance between the surface of the trunk and the surface of the seat and subtracts the volume of the free space from a volume of a space between the surface representing the trunk and the surface of the seat to calculate the volume of the trunk of the occupant. With this configuration, for example, the volume of the free space between the trunk of the occupant and the seat is taken into consideration. Consequently, the calculation accuracy of the volume of the occupant can be improved.

In the occupant detection device of the embodiment, for example, the calculator further determines that a free space between the trunk and the seat is present and calculates a volume of the free space, when an angle between the surface representing the trunk and the surface of the seat is equal to or larger than a predetermined angle. With this configuration, for example, when the occupant is inclined, it is regarded that a free space occurs, and the volume of the free space is calculated. Consequently, the calculation accuracy of the volume of the occupant can be improved, and the calculation load can be reduced.

In the occupant detection device of the embodiment, for example, the trunk surface specifier specifies the position of the surface representing the trunk by regarding regions excluding a head and arms of a body of the occupant recognized based on the captured image data as the trunk of the occupant. With this configuration, for example, the volume of the occupant is calculated in a manner that regions excluding the head and the arms, which have a wide range of motion, are regarded as the trunk of the occupant. Consequently, the calculation accuracy of the volume of the occupant can be improved.

The occupant detection device of the embodiment further includes, for example, a determiner that determines a physical size of the occupant based on the volume of the trunk of the occupant calculated by the calculator. With this configuration, for example, the physical size of the occupant is determined based on the volume of the trunk calculated with high accuracy. Consequently, the determination accuracy of the physical size of the occupant can be improved.

BRIEF DESCRIPTION OF DRAWINGS

FIG. 8 is a flowchart illustrating a procedure of processing for determining the physical size of the occupant in the occupant detection system in the embodiment; and FIG. 9 is a flowchart illustrating a procedure of processing for calculating the volume of a trunk part of the occupant in the occupant detection system in the embodiment.

DESCRIPTION OF EMBODIMENTS

Exemplary embodiments of the present invention are disclosed below. Configurations in the following embodiments and functions, results, and effects obtained by the configurations are illustrative. The present invention can be implemented by configurations other than those disclosed in the following embodiments, and can obtain at least one of various effects and derivative effects based on the basic configurations.

Figure 1:
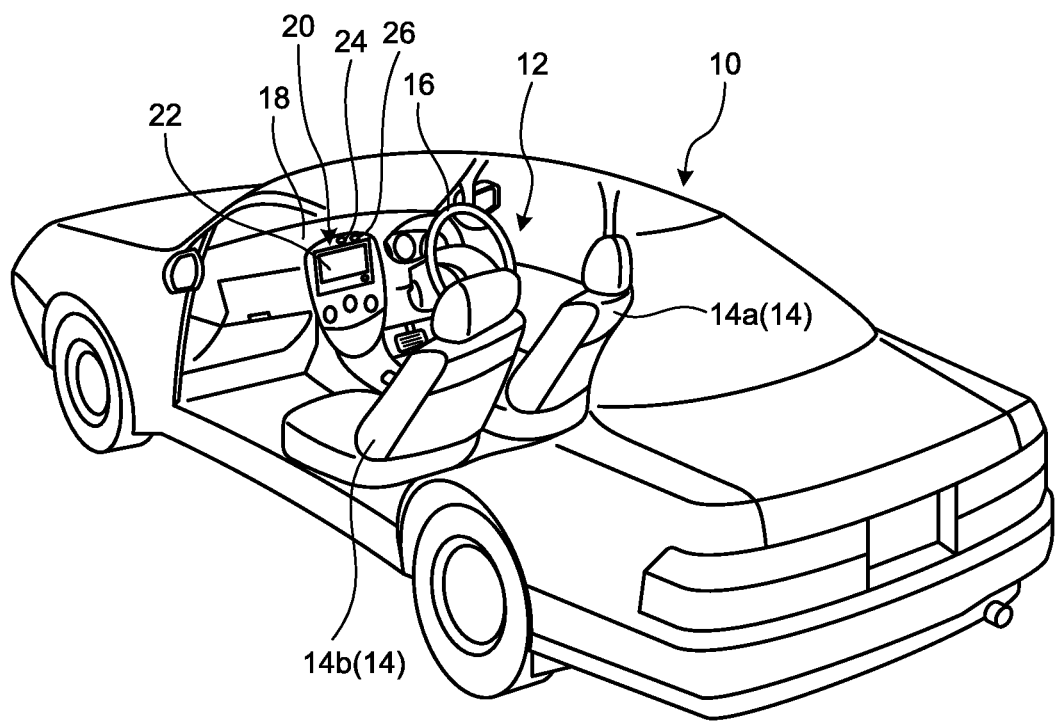
FIG. 1 is a perspective view illustrating one example of a state in which a part of vehicle interior of a vehicle is seen through, according to an embodiment.

FIG. 1 is a perspective view illustrating one example of a state in which a part of a vehicle interior 12 of a vehicle 10 having an occupant detection device mounted thereon is seen through, according to an embodiment. In the present embodiment, the vehicle 10 on which the occupant detection device (occupant detection system) is mounted may be, for example, an automobile using an internal combustion engine (not illustrated) as a driving source, that is, an internal combustion engine vehicle, or may be an automobile using a motor (not illustrated) as a driving source, that is, an electric vehicle or a fuel cell vehicle. The vehicle 10 may be a hybrid vehicle using both an internal combustion engine and a motor as driving sources, or may be an automobile provided with another driving source.

As exemplified in FIG. 1, the vehicle 10 constitutes the vehicle interior 12 where an occupant (not illustrated) such as a driver and a passenger gets in. In the vehicle interior 12, a seat 14a (driver's seat) for a driver as the occupant, a seat 14b (passenger's seat) for a passenger, and a rear seat (not illustrated) are provided. A steering wheel 16 and a dashboard 18 are provided to face the seats 14a and 14b. A monitor device 20 is provided at substantially the center of the dashboard 18 as an information provider that provides various kinds of information to the driver and the passenger. For example, the monitor device 20 includes a display device 22 configured by a liquid crystal display (LCD) or an organic electroluminescent display (OELD). The monitor device 20 includes a voice output device (for example, speaker). For example, the display device 22 is covered with a transparent operation input unit such as a touch panel. An occupant (driver or passenger) can visually recognize images displayed on a display screen of the display device 22 through the operation input unit. The occupant can execute an operation input by operation of touching, pushing, or moving the operation input unit with a finger at a position corresponding to an image displayed on the display screen of the display device 22. The monitor device 20 can have an operation input unit (not illustrated) such as a switch, a dial, a joystick, or a push button. A voice output device (not shown) can be provided at a different position in the vehicle interior 12 from the monitor device 20, and voice can be output from the voice output device in the monitor device 20 and another voice output device. Note that the monitor device 20 may also function as, for example, a navigation system or an audio system.

The occupant detection system including the occupant detection device in the present embodiment captures images in the direction of a seat 14. When an occupant is seated on the seat 14, the physical size of the occupant seated on the seat 14a or 14b is detected. Thus, a seated state detection system includes a camera 24 as an image capturer that captures the seat 14a and 14b and a distance image sensor 26 that calculates a distance to the seat 14a or 14b or the occupant seated on the seat 14a or 14b.

For example, the camera 24 can be provided to the monitor device 20 located at substantially the center of the dashboard 18 as illustrated in FIG. 1. The distance image sensor 26 is further provided at this position. The camera 24 and the distance image sensor 26 can include both the seats 14a and 14b in the capturing range. Specifically, the camera 24 in the present embodiment captures the seats 14a and 14b and occupants seated on the seats 14a and 14b. The distance image sensor 26 detects a distance to the seat 14a or 14b or a distance to an occupant present in the direction of the seat 14a or 14b, and outputs the detected distance as distance image data.

Note that the positions at which the camera 24 and the distance image sensor 26 are provided are not limited. For another example, a camera 24 and a distance image sensor 26 may be provided at positions on the driver's seat side of the steering wheel 16 or the dashboard 18 as a camera and a distance image sensor for the seat 14a serving as a driver's seat, and a camera 24 and a distance image sensor 26 may be provided on the passenger's seat side of the dashboard 18, such as in the vicinity of an airbag housing space, as a camera and a distance image sensor for the seat 14b serving as a passenger's seat.

For example, the camera 24 may be a commonly-used visible light camera for visible light or may be an infrared camera that detects infrared light (infrared rays). As a visible light camera, for example, a digital camera in which a capturing element such as a charge coupled device (CCD) is incorporated can be used. As an infrared camera, for example, a digital camera in which a capturing element such as a charge coupled device (CCD) having sufficient sensitivity to a predetermined wavelength, specifically, infrared rays in a wavelength range different from infrared rays emitted from a human body is incorporated, can be used.

The distance image sensor 26 is a sensor that calculates a distance to a subject based on a time required for projected laser to travel back and forth to the subject. As the distance image sensor 26, for example, the time-of-flight (TOF) system may be used. In this manner, the distance image sensor 26 detects distances to each site of the body of an occupant present in the direction of the seat 14a or 14b (for example, seated), and outputs the detection result as distance image data. Note that, in the present embodiment, one example where distance image data indicating distances to each site of the body of an occupant present in the direction of the seat 14a or 14b (for example, seated) is used is described, but any distance data can be used as long as the data indicates distances to each site of the body of an occupant.

Figure 2:
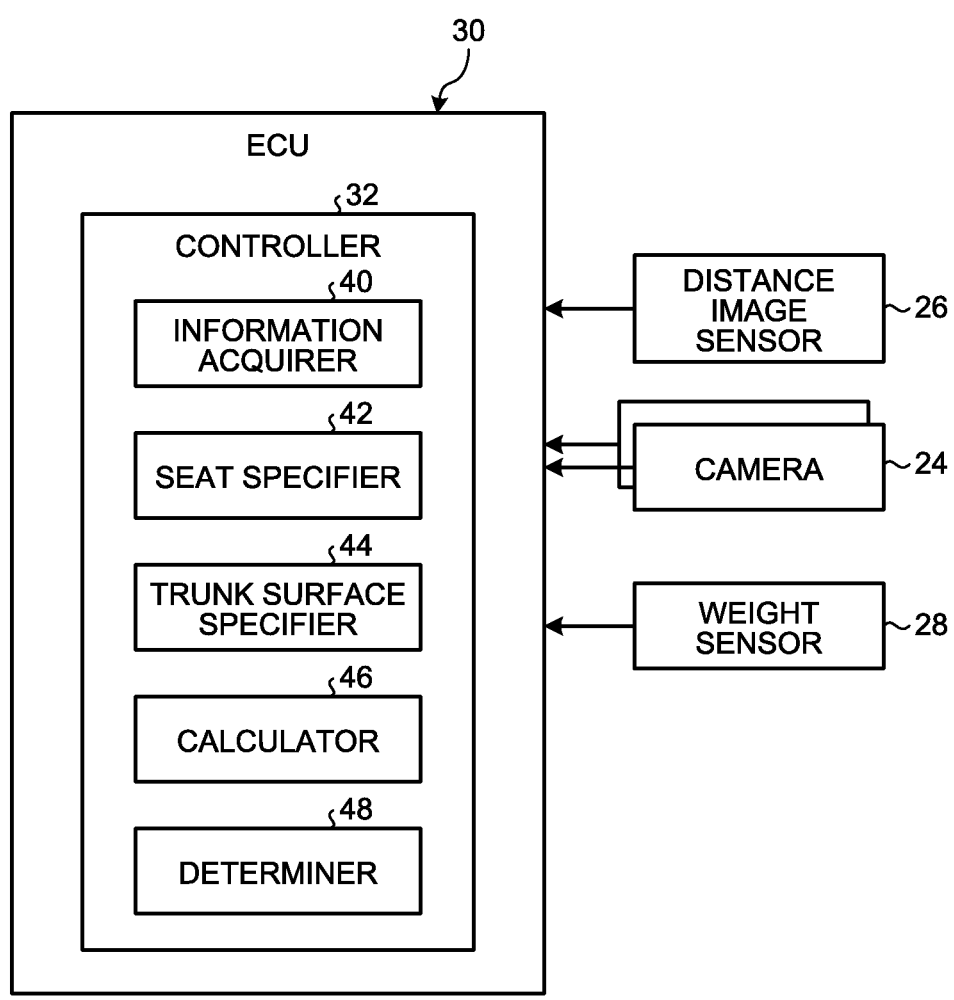
FIG. 2 is a block diagram illustrating one example of an occupant detection system in the embodiment.

FIG. 2 is a block diagram illustrating one example of the occupant detection system including the occupant detection device in the embodiment. An ECU 30 that implements the occupant detection device includes, for example, a controller 32 having a central processing unit (CPU), a read only memory (ROM), and a random access memory (RAM). The controller 32 reads a computer program installed and stored in a nonvolatile storage device such as a ROM, and executes the computer program to implement various kinds of configurations. As a result, the controller 32 includes, for example, an information acquirer 40, a seat specifier 42, a trunk surface specifier 44, a calculator 46, and a determiner 48.

The information acquirer 40 acquires information from various kinds of sensors provided in the vehicle 10. For example, the information acquirer 40 acquires captured image data taken by the camera 24. For another example, the information acquirer 40 acquires distance image data taken by the distance image sensor 26. Furthermore, the information acquirer 40 acquires data indicating the weight detected by a weight sensor 28.

Figure 3:
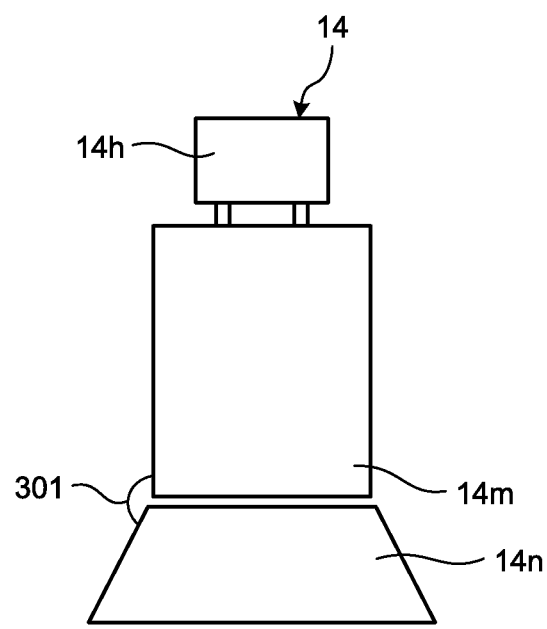
FIG. 3 is a schematic diagram for explaining one example of a seat acquired by captured image data and distance image data in the embodiment.

FIG. 3 is a schematic diagram for explaining one example of the seat 14 acquired by the captured image data and the distance image data in the embodiment. The seat 14 is constituted by a backrest surface 14m (back seat), a seating surface 14n, and a headrest 14h. The seating surface 14n can move in the front-back direction, and the angle of the backrest surface 14m can be adjusted.

The seat specifier 42 in the present embodiment calculates the position of the seating surface 14n in the front-back direction and an angle 301 of the backrest surface 14m based on captured image data and distance image data acquired when no occupant is present, and specifies the position of the surface (backrest surface 14m) of the seat 14. Note that one example where the seat specifier 42 in the present embodiment specifies the position of the surface of the seat 14 based on the captured image data and the distance image data is described, but a method for specify the position of the surface of the seat 14 is not limited to this method based on the captured image data and the distance image data. For example, an inclination amount of the backrest surface 14m and a sliding movement amount of the seating surface 14n in the front-back direction may be acquired to specify the position of the surface (backrest surface 14m) of the seat 14.

Returning to FIG. 2, the trunk surface specifier 44 specifies the position of a surface representing the trunk of the occupant based on the captured image data and the distance image data acquired by the information acquirer 40.

Figure 4:
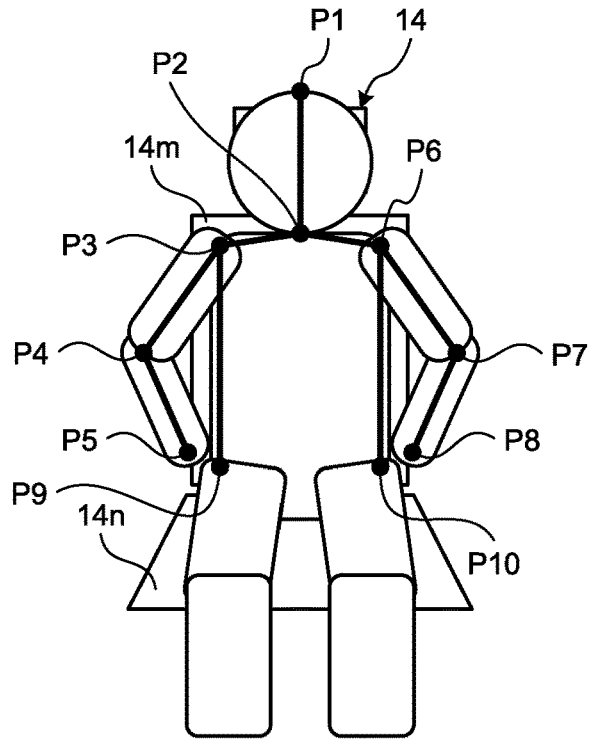
FIG. 4 is a diagram exemplifying the posture of an occupant detected by a trunk surface specifier in the embodiment.

First, the trunk surface specifier 44 in the present embodiment detects the posture of the occupant present in the direction of the seat 14 (seated on seat 14) based on the captured image data and the distance image data acquired by the information acquirer 40. FIG. 4 is a diagram exemplifying the posture of the occupant detected by the trunk surface specifier 44 in the present embodiment. As illustrated in FIG. 4, the trunk surface specifier 44 in the present embodiment analyzes the captured image data to estimate joint points (P1, P2, P3, P4, P5, P6, P7, P8, P9, and P10) of the occupant. The trunk surface specifier 44 then estimates the posture of the occupant based on the positions of the joint points and the lengths of predetermined parts of the human body.

Figure 5:
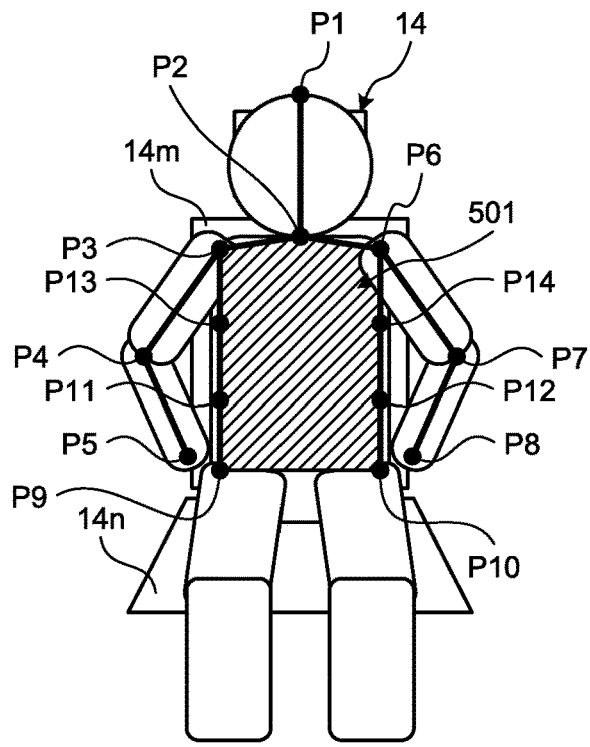
FIG. 5 is a diagram exemplifying a trunk surface specified by the trunk surface specifier in the embodiment.

Next, the trunk surface specifier 44 specifies a surface representing the trunk of the occupant (hereinafter referred to also as "trunk surface") from the estimated posture of the occupant. FIG. 5 is a diagram exemplifying the trunk surface specified by the trunk surface specifier 44 in the present embodiment. As illustrated in FIG. 5, the trunk surface specifier 44 further estimates, in addition to the joint points (P1 (vertex), P2 (neck), P3 (right shoulder), P4 (right elbow), P5 (right hand), P6 (left shoulder), P7 (left elbow), P8 (left hand), P9 (right waist), and P10 (left waist)) of the occupant estimated for the posture of the occupant, positional coordinates (P11 (⅓ of waist) and P13 (⅔ of waist)) of the right side of the trunk of the occupant and positional coordinates (P12 (⅓ of waist) and P14 (⅔ of waist)) of the left side thereof. Then, the trunk surface specifier 44 specifies a surface including the position coordinates (P9 to P14) indicating the trunk of the occupant, that is, a trunk surface 501 of the occupant.

In the present embodiment, regions excluding the head (P1) and the elbows and hands (P4, P5, P7, and P8) are regarded as the trunk of the occupant. Specifically, the ranges of motion of the head and the arms (for example, elbows and hands) of the occupant are wide, and hence it is difficult to calculate the volume of the trunk of the occupant easily and accurately in consideration of the head and the arms. Thus, in the present embodiment, regions (for example, shoulders and waist) excluding the head and the arms are regarded as the trunk of the occupant, and the volume of a trunk part of the occupant is calculated based on the trunk surface that indicates the trunk of the occupant as a surface.

In this manner, for example, in the present embodiment, even when the arm overlaps in front of the trunk in the capturing direction of the camera 24, the trunk surface specifier 44 in the present embodiment specifies the trunk surface based on another region where the arm is absent (in the present embodiment, the position of the waist). With this configuration, the volume of the trunk part can be accurately calculated.

The calculator 46 calculates the volume of the trunk part of the occupant based on the position of the trunk surface and the position of the surface of the seat. The calculator 46 in the present embodiment can specify the volume of a space between the trunk surface and the surface of the seat based on the position of the trunk surface and the position of the surface of the seat. Thus, the present embodiment assumes that the trunk part of the occupant is present in the space between the trunk surface and the surface of the seat. First, the volume of the space between the trunk surface and the surface of the seat is calculated as the volume of the trunk part of the occupant.

However, there may be a case where a free space is present between the trunk part of the occupant and the surface of the seat. In such a case, an error occurs in the volume of the trunk part of the occupant if the volume of the space between the trunk surface and the surface of the seat is simply regarded as the volume of the trunk part of the occupant.

Thus, the calculator 46 calculates the volume of a free space between the occupant and the seat and subtracts this volume indicating the free space from the volume of the space between the trunk surface and the surface of the seat, so that the volume of the trunk part of the occupant is calculated.

Figure 6:
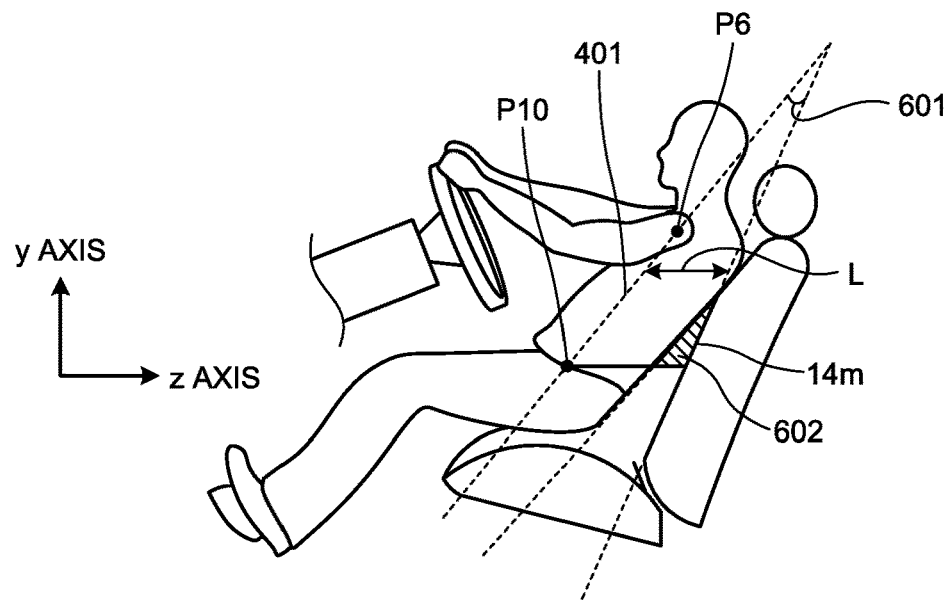
FIG. 6 is a diagram exemplifying a positional relationship between the trunk surface of the occupant and a surface of the seat in a height direction (y axis direction) and a depth direction (z axis direction)

FIG. 6 is a diagram exemplifying a positional relationship between the trunk surface of the occupant and the surface of the seat in a height direction (y axis direction) and a depth direction (z axis direction). As illustrated in FIG. 6, in the present embodiment, at least a part of the trunk part of the occupant is in contact with the seat. When the trunk part of the occupant is in close contact with the seat, almost no free space occurs between the trunk part of the occupant and the seat, and an angle difference between the trunk surface of the occupant and the surface of the seat is small. In contrast, when the occupant sits on the front edge side of the seat, a free space 602 occurs between the trunk part of the occupant and the seat, and an angle difference 601 between the trunk surface of the occupant and the surface of the seat is large.

Thus, the calculator 46 in the present embodiment determines that the free space 602 is present between the trunk part of the occupant and the seat when the angle between the trunk surface and the surface of the seat in the height direction (y axis direction) and the depth direction (z axis direction) is equal to or larger than a predetermined angle. For example, the trunk surface in the height direction (y axis direction) and the depth direction (z axis direction) is represented by a straight line 401 connecting a middle point between P3 and P6 and a middle point between P9 and P10. The calculator 46 calculates an angle between the straight line 401 and the surface of the seat, and determines whether the calculated angle is equal to or larger than a predetermined angle. In this manner, it can be determined whether the angle between the trunk surface and the surface of the seat is equal to or larger than a predetermined angle, in the height direction (y axis direction) and the depth direction (z axis direction).

The calculator 46 in the present embodiment defines the shortest distance among distances between the trunk surface and the surface of the seat as a distance (shortest distance L) when the trunk part of the occupant and the seat are in close contact with each other, and defines a distance larger than the defined distance as a distance when the free space 602 is present. In other words, a difference distance, which is obtained by subtracting the shortest distance L from each distance between the trunk surface and the surface of the seat, has the length of the free space 602 in the depth direction. The calculator 46 integrates the lengths in the depth direction to calculate the volume of the free space 602.

In the example illustrated in FIG. 6, one example where a deviation between the occupant and the seat is detected in the height direction and the depth direction has been described. However, a deviation between the occupant and the seat occurs not only in the height direction and the depth direction but also in a width direction (x axis direction) and the depth direction (z axis direction). Thus, the calculator 46 in the present embodiment also determines whether a deviation occurs in the width direction (x axis direction) and the depth direction (z axis direction).

Figure 7:
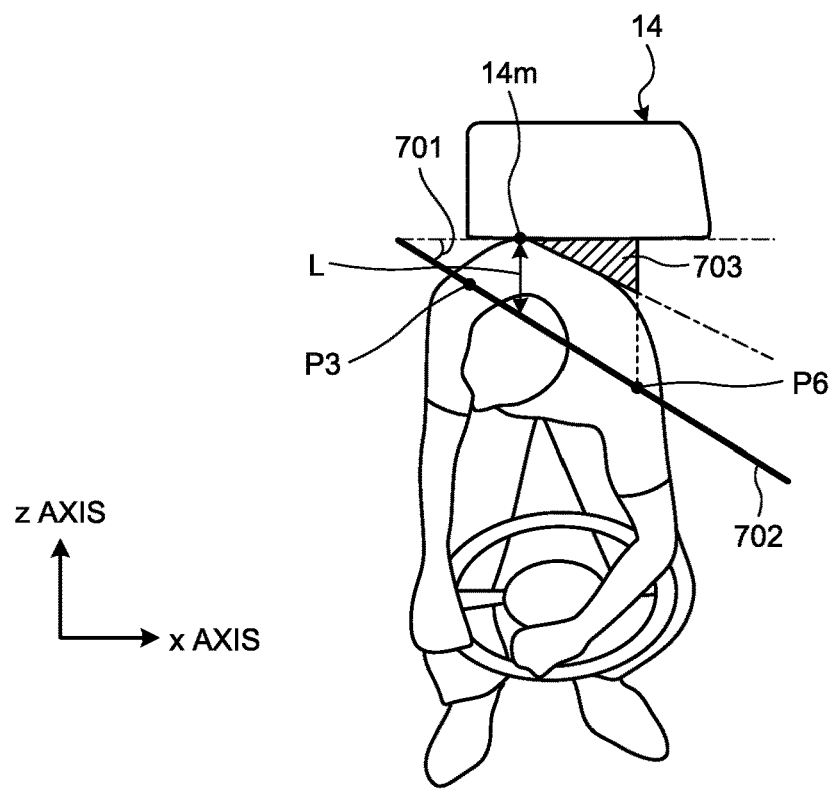
FIG. 7 is a diagram exemplifying a positional relationship between the trunk surface of the occupant and the surface of the seat in a width direction (x axis direction) and the depth direction (z axis direction)

FIG. 7 is a diagram exemplifying a positional relationship between the trunk surface of the occupant and the surface of the seat in the width direction (x axis direction) and the depth direction (z axis direction). Also in the example illustrated in FIG. 7, at least a part of the trunk part of the occupant is in contact with the seat. FIG. 7 is one example where the trunk surface including the positions (P3 and P6) of the shoulders of the trunk part is specified. When the trunk part of the occupant is in close contact with the seat, almost no free space occurs between the trunk part of the occupant and the seat, and an angle difference between the trunk surface of the occupant and the surface of the seat is small. In contrast, when the occupant twists the trunk part (due to steering operation), a free space 703 occurs between the trunk part of the occupant and the seat, and an angle difference 701 between the trunk surface of the occupant and the surface of the seat becomes large.

Thus, the calculator 46 in the present embodiment determines that the free space 703 is present between the trunk part of the occupant and the seat when the angle between the trunk surface and the surface of the seat in the width direction (x axis direction) and the depth direction (z axis direction) is equal to or larger than a predetermined angle. For example, the trunk surface in the width direction (x axis direction) and the depth direction (z axis direction) is represented by a straight line 702 connecting a middle point between P3 and P9 and a middle point between P6 and P10. The calculator 46 calculates an angle between the straight line 702 and the surface of the seat, and determines whether the calculated angle is equal to or larger than a predetermined angle. In this manner, it can be determined whether the angle between the trunk surface and the surface of the seat is equal to or larger than a predetermined angle, in the width direction (x axis direction) and the depth direction (z axis direction). Note that a method for calculating the volume of the free space 703 is the same as the above-mentioned method, and hence description thereof is omitted.

The calculator 46 subtracts the volume indicating the free space 703 from the volume of the space between the trunk surface and the surface of the seat to calculate the volume of the trunk part of the occupant.

In the present embodiment, the timing of calculating the volume of the trunk part is not particularly limited. As a modification of the timing of calculating the volume of the trunk part, the calculator 46 may set the priority of the calculated volume of the trunk part based on the inclination of the trunk of the occupant. Specifically, the calculator 46 in the modification may determine that the volume of the trunk of the occupant calculated when the inclination of the trunk is small is more accurate than the volume of the trunk of the occupant calculated when the inclination of the trunk of the occupant is large. By using the volume of the trunk of the occupant calculated when the inclination of the trunk is small, the need of taking the free space into consideration is reduced, and hence the calculation accuracy of the volume can be improved.

Returning to the embodiment, the determiner 48 determines the physical size of the occupant based on the volume of the trunk part of the occupant calculated by the calculator 46. In the present embodiment, the correspondence relationship between the volume and the physical size is stored in the ROM. The determiner 48 determines the physical size of the occupant from the physical size associated with the volume of the trunk part of the occupant calculated by the calculator 46.

The occupant detection system including the occupant detection device in the present embodiment has the above-mentioned configuration, and is capable of calculating the volume of the trunk part of the occupant easily and accurately. In this manner, the detection accuracy of the physical size of the occupant can be improved. Thus, the accuracy of airbag control depending on the occupant can be improved.

Next, the processing for determining the physical size of the occupant in the occupant detection system including the occupant detection device in the present embodiment is described. FIG. 8 is a flowchart illustrating a procedure of the above-mentioned processing in the occupant detection system in the present embodiment. Note that, in the following embodiment, thresholds for the volume are set such that "threshold A>threshold B>threshold N" is established.

First, the information acquirer 40 starts to acquire distance image data captured by the distance image sensor 26 and captured image data captured by the camera 24 (S801).

Next, the seat specifier 42 specifies the position of the surface of the seat 14 based on the captured image data and the distance image data acquired by the information acquirer 40 (S802). In the present embodiment, the position of the surface of the seat 14 (which is specified based on angle of backrest surface 14*m* and position of seating surface 14*n*) is grasped before the occupant boards the vehicle 10 and the seat 14 goes out of view of the camera 24. In the case where the seat 14 is slidingly moved after the occupant is seated on the seat 14, the information acquirer 40 may acquire the sliding movement amount. In this case, the seat specifier 42 specifies the position of the surface of the seat 14 based on the sliding movement amount.

The determiner 48 determines whether the occupant is present on the seat 14 (S803). The determiner 48 in the present embodiment determines whether the occupant is present on the seat 14 based on whether the occupant is detected from the captured image data and based on the weight detected by the weight sensor 28 provided to the seat 14. When the determiner 48 determines that the occupant is not present on the seat 14 (No at S803), the processing of S803 is performed again after a predetermined period has elapsed.

When the determiner 48 determines that the occupant is present on the seat 14 (Yes at S803), the trunk surface specifier 44 detects the posture of the occupant present on the seat 14 based on the captured image data and the distance image data (S804).

Next, the trunk surface specifier 44 specifies the position of the trunk surface of the occupant from the detected posture of the occupant (S805).

The calculator 46 calculates a distance between the trunk surface of the occupant and the surface of the seat 14 in the depth direction (traveling direction of vehicle 10) based on the positional relation between the surface of the seat 14 and the trunk surface (S806). In the present embodiment, the calculator 46 calculates the distance between the trunk surface of the occupant and the surface of the seat 14 in the depth direction (traveling direction of vehicle 10) for each predetermined region included in the trunk surface.

The calculator 46 further calculates the volume of the trunk part of the occupant (S807). Note that the detail of a method for calculating the volume of the trunk part of the occupant is described later.

Next, the determiner 48 determines whether the volume of the trunk part is equal to or larger than a threshold A (S808). When the determiner 48 determines that the volume of the trunk part is equal to or larger than the threshold A (Yes at S808), the determiner 48 determines that the physical size of the occupant is a physical size A (S809).

When the determiner 48 determines that the volume of the trunk part is smaller than the threshold A (No at S808), the determiner 48 determines whether the volume of the trunk part is equal to or larger than a threshold B (S810). When the determiner 48 determines that the volume of the trunk part is equal to or larger than the threshold B (Yes at S810), the determiner 48 determines that the physical size of the occupant is a physical size B (S811).

When the determiner 48 determines that the volume of the trunk part is smaller than the threshold B (No at S810), the determiner 48 determines whether the volume of the trunk part is equal to or larger than a threshold N (S812). When the determiner 48 determines that the volume of the trunk part is equal to or larger than the threshold N (Yes at S812), the determiner 48 determines that the physical size of the occupant is a physical size N (S813).

When the determiner 48 determines that the volume of the trunk part is smaller than the threshold N (No at S812), the determiner 48 determines that the physical size of the occupant is a physical size N' (S814).

In the above-mentioned processing procedure, the physical size depending on the volume of the trunk part of the occupant can be simply and accurately detected from among the physical size A, the physical size B, the physical size N, and the physical size N'. In the present embodiment, one example where the physical size has four types of physical size A, the physical size B, the physical size N, and the physical size N' is described. However, the number of types of the physical size may be three or less or five or more, and the types suited for the embodiment should be set.

Next, the processing for calculating the volume of the trunk part of the occupant at S807 in FIG. 8 in the occupant detection system including the occupant detection device in the present embodiment is described. FIG. 9 is a flowchart illustrating a procedure of the above-mentioned processing in the occupant detection system in the present embodiment.

The calculator 46 calculates, for each predetermined region included in the trunk surface, the length of the trunk part of the occupant in the depth direction based on a distance between the trunk part and the surface of the seat 14 in the depth direction (traveling direction of vehicle 10) (S901). In the present embodiment, the shortest distance among distances between the trunk part and the surface of the seat 14 for each predetermined region in the depth direction is calculated as the length of the trunk part of the occupant in the depth direction.

Next, the calculator 46 calculates the volume of the trunk part of the occupant while regarding the region between the surface of the seat 14 and the trunk surface as the trunk part of the occupant (S902).

The calculator 46 calculates a first angle difference between the trunk surface and the surface of the seat 14 in the height direction and the depth direction (S903). The calculator 46 calculates a second angle difference between the trunk surface and the surface of the seat 14 in the width direction and the depth direction (S904).

Next, the calculator 46 determines whether at least one of the condition that the first angle difference between the trunk surface and the surface of the seat 14 in the height direction and the depth direction is equal to or larger than a first threshold and the condition that the second angle difference between the trunk surface and the surface of the seat in the width direction and the depth direction is equal to or larger than a second threshold is satisfied (S905).

When the calculator 46 determines that at least one of the condition that the first angle difference is equal to or larger than the first threshold and the condition that the second angle difference is equal to or larger than the second threshold is not satisfied (No at S905), the processing is finished.

when the calculator 46 determines that at least one of the condition that the first angle difference is equal to or larger than the first threshold and the condition that the second angle difference is equal to or larger than the second threshold is satisfied (Yes at S905), the calculator 46 subtracts, for each predetermined region included in the trunk surface, the length of the trunk part of the occupant in the depth direction from the distance to the seat surface to calculate the distance in the free space in the depth direction (S906).

The calculator 46 integrates the distances in the free space in the depth direction calculated for the predetermined regions to calculate the volume of the free space (S907).

Furthermore, the calculator 46 subtracts the volume of the free space from the volume of the trunk part calculated at S902 to calculate the volume of the trunk part again, and the processing is then finished (S908).

In the above-mentioned processing procedure, the volume of the trunk part of the occupant is calculated in consideration of the free space between the trunk part of the occupant and the surface of the seat on the basis of the trunk part of the occupant and the surface of the seat, and hence the volume of the trunk part can be calculated easily and accurately.

In the present embodiment, the volume of the trunk part of the occupant is calculated in consideration of the angle of the posture of the occupant, and hence the volume of the trunk part of the occupant can be accurately calculated regardless of a change in situation, such as when the occupant sits on the front edge of the seat or sits back in the seat.

In the present embodiment, the volume of the occupant is calculated in a manner that the volume of the trunk part excluding the arms and the head, which are causes of decrease in calculation accuracy, is calculated. Thus, the calculation accuracy of the volume can be improved.

In the present embodiment, the volume of the trunk part of the occupant, who is present in a range limited to some extent, is calculated. Thus, the volume of the occupant can be accurately calculated even when the head or the arm is away from the seat in a situation where the occupant leans against a door.

While some embodiments of the present invention have been described, the embodiments are illustrative and not intended to limit the scope of the invention. These novel embodiments can be implemented in other various forms, and various omissions, replacements, and changes can be made within the range not departing from the gist of the invention. These embodiments and modifications thereof are included in the scope and gist of the invention, and included in the invention described in the claims and its equivalents.

The invention claimed is:

1. An occupant detection device, comprising:
   an acquirer that acquires captured image data output from an image capturer capturing a seat and distance data indicating a distance to an occupant present in a direction of the seat;
   a seat specifier that specifies a position of a surface of the seat;
   a trunk surface specifier that specifies a position of a surface representing a trunk of the occupant based on the captured image data and the distance data; and
   a calculator that calculates a volume of the trunk of the occupant present between the seat and the image capturer based on the position of the surface representing the trunk and the position of the surface of the seat,
   wherein the calculator further calculates a volume of a free space between the occupant and the seat based on a difference in distance between the surface of the trunk and the surface of the seat and subtracts the volume of the free space from a volume of a space between the surface representing the trunk and the surface of the seat to calculate the volume of the trunk of the occupant.

2. The occupant detection device according to claim 1, wherein
   the calculator further determines that a free space between the trunk and the seat is present and calculates a volume of the free space, when an angle between the surface representing the trunk and the surface of the seat is equal to or larger than a predetermined angle.

3. The occupant detection device according to claim 1, wherein
   the trunk surface specifier specifies the position of the surface representing the trunk by regarding regions excluding a head and arms of a body of the occupant recognized based on the captured image data as the trunk of the occupant.

4. The occupant detection device according to claim 1, further comprising
   a determiner that determines a physical size of the occupant based on the volume of the trunk of the occupant calculated by the calculator.

* * * * *